UNITED STATES PATENT OFFICE.

AZARIAH H. MIKESELL, OF OAKLAND, CALIFORNIA, ASSIGNOR, BY DIRECT AND MESNE ASSIGNMENTS, OF ONE-HALF TO JOSEPH DIETRICH, OF OAKLAND, CALIFORNIA, AND ONE-TENTH TO CHARLES DIETRICH, OF SAN FRANCISCO, CALIFORNIA.

COMPOSITION OF MATTER FOR FIRE AND WATER PROOF PAINT.

1,415,380.  Specification of Letters Patent.  Patented May 9, 1922.

No Drawing.  Application filed August 3, 1921. Serial No. 489,569.

*To all whom it may concern:*

Be it known that I, AZARIAH H. MIKESELL, a citizen of the United States, and a resident of the city of Oakland, in the county of Alameda and State of California, have invented a new and useful Improvement in a certain Composition of Matter for Fire and Water Proof Paint; and I do declare the following to be a full, clear, and exact description of the invention, such as will enable others skilled in the art to which it appertains to make and use the same.

My invention relates to fire proof and water proof paints, containing neither oil or lead pigments.

One of the objects of my invention is to provide a covering for combustible materials used in buildings which is non-inflammable and impervious to water.

Another object of my invention is to provide a cheap and suitable material which may be applied in a semi-liquid condition to the exterior or interior of buildings with the quality of preserving the structure whether it be of wood, iron, brick or concrete.

A further object of my invention is to supply a composition of matter that may be used as a substitute for paint composed of white lead and oil, with the added quality of being more highly resistant to the action of the elements.

A still further object of my invention is to provide a non metallic and oil-less paint for all purposes, which may be manufactured cheaply and preserved in a plastic form for long periods of time, and which may be readily prepared for use by the addition of water only.

My invention is clearly and definitely pointed out in the following description and claims:

In compounding my invention I use the following ingredients in about the following proportions:

To manufacture seventy-five gallons of paint, I use twenty-five pounds of casein, two and one half pounds of borax and seventy-two and one half pounds of calcined magnesite residue, to which is added sixty gallons of water.

I mix my casein in the regular way, by dissolving the borax in twenty gallons of boiling water and stir until the borax is thoroughly dissolved and the water has cooled to 200° F.; then I add the casein slowly, while holding the temperature at 175° F., for two hours. The heat is then removed and the compound is left at rest for twelve hours, when it is again heated to 175° F., being stirred constantly during the heating process. A jacketed kettle should be used to avoid scalding or burning. When the composition has reached a temperature of 175° F., the magnesite residue, reduced to approximately 100 mesh, depending upon the character of the surface to be covered or the use to which the composition is to be put, should be sifted in while the stirring continues. This will make a thick paste that will be semi-solid when cold. I make it in this form so that it may be put up in paper containers and is more convenient for handling and shipping, as it may be prepared for use by the simple addition of water as it is needed; however, the entire quantity of water may be added at the time of compounding, and the finished product put up for shipment in tin or other suitable containers.

While I use borax to put my casein into solution, I do not confine myself exclusively to its use; I may use lime water or any other suitable alkali for the same purpose, but experience has shown that more satisfactory results may be obtained by the use of borax.

Referring to the residue of magnesite mentioned in the former part of this description, I mean that part of calcined magnesite that is left over after the available magnesium chloride ($MgCl_2$) has been extracted, and which has heretofore been generally considered as of no value. It is composed of silica and lime, still carrying a fair percentage of magnesium that is fused with silica, which is converted into silicate of magnesium in the hot water that is used in the preparation of my composition; and it is the chemical action of this silicate of magnesium and lime on the casein in the composition that makes it impervious to water when dry. This composition when properly prepared, may be used and applied in any manner that is suitable for the application of other paints, but it has these advantages over any other paint with which I am familiar, namely: There is a percentage of chloride in the magnesite residue, that enters into the paint as a pigment and remains inert until heated to 300° C., when it is decomposed with the liberation of chlorine gas, that readily extinguishes either flame or glowing embers. The calcium carbonate in the magnesite residue is converted into lime by the calcining process and this lime is in suspension as long as there is any water present, but rendering it insoluble when it dries out, as does formaldehyde when used.

To further elucidate my meaning and to illustrate and explain the results of my experiments, I will say that the specific gravity of magnesite as it comes from the mine, is 3.635; and the residue that I use in my composition, owing to the multiplicity of cells left by the calcining process, has reduced this specific gravity more than one half, and its extreme porousness makes it one of the best known non-conductors of heat.

Surfaces covered with this composition are rendered fire proof, because they are covered with a non-combustible, flexible paint, made with an elastic non-combustible binder, a highly insulating pigment and a chlorine salts that is converted into a chlorine gas by heat, that will extinguish flames and embers.

I am aware that my method of putting casein into solution is not new and I do not claim it alone as my invention, but I do not know and do not believe that it has ever been used as a binder with magnesite residue, or that magnesite residue has ever been used as a pigment for fire-proof or water-proof paint; neither do I know or believe that paint has ever been prepared in a plastic, semi-solid mass, for handling and shipment.

Having thus described my invention, what I claim as new and desire to secure by Letters Patent, is:

1. The composition of matter as above described, comprising casein in a borax solution in the proportion of twenty-five pounds; magnesite residue in the proportion of seventy-two and one half pounds and water in the proportion of sixty gallons.

2. The composition of matter in plastic form as described, comprising casein in solution in about the proportion of twenty five pounds of casein to seventy-two and one half pounds of calcined magnesite residue and sixty gallons of water.

3. In combination, the composition of matter in plastic form as above described, comprising two and one half pounds of borax, twenty five pounds of casein in solution, seventy-two and one half pounds of calcined magnesite residue and sufficient water to make a thick paste.

AZARIAH H. MIKESELL.